US007127228B2

United States Patent
Chang et al.

(10) Patent No.: US 7,127,228 B2
(45) Date of Patent: Oct. 24, 2006

(54) PORTABLE ELECTRIC DEVICE WITH POWER FAILURE RECOVERY AND OPERATION METHOD THEREOF

(75) Inventors: Hsin-Chin Chang, Taipei (TW); Chen-Huang Fan, MaioLee Hsien (TW); Ben-Chuan Du, Taipei Hsien (TW)

(73) Assignee: Acer Communications and Multimedia Inc., Taoyuan (TW)

( * ) Notice: Subject to any disclaimer, the term of this patent is extended or adjusted under 35 U.S.C. 154(b) by 895 days.

(21) Appl. No.: 10/014,260

(22) Filed: Dec. 7, 2001

(65) Prior Publication Data

US 2003/0109243 A1  Jun. 12, 2003

(51) Int. Cl.
*H04B 1/16* (2006.01)
*H04B 1/034* (2006.01)
*H04B 1/38* (2006.01)

(52) U.S. Cl. .............................. 455/343.1; 455/343.5; 455/343.6; 455/572; 455/573; 455/574; 455/127.1

(58) Field of Classification Search ............. 455/343.1, 455/343.5, 346.6, 572, 573, 574, 127.1
See application file for complete search history.

(56) References Cited

U.S. PATENT DOCUMENTS

| 5,036,532 A | * | 7/1991 | Metroka et al. ............. 455/566 |
| 5,551,077 A | * | 8/1996 | Oda ........................ 455/343.6 |
| 6,097,973 A | * | 8/2000 | Rabe et al. ................. 455/572 |
| 6,795,913 B1 | * | 9/2004 | Ricordel ........................ 713/2 |

* cited by examiner

Primary Examiner—Barry Taylor
(74) Attorney, Agent, or Firm—Ladas & Parry LLP

(57) ABSTRACT

A portable electronic device with power failure recovery, powered by a main power source, the device comprising a power detection module, a processor, a timing unit and a power management unit. The power detection module detects an output characteristic from the main power source and asserts an interrupt signal if the characteristic is below a threshold value. The processor asserts a turn-off signal and an enable signal in response to the interrupt signal. The timing unit asserts a notification signal at a predetermined time interval when the enable signal is asserted. Upon receipt of the turn-off signal, the power management unit disconnects the main power source from a circuit block. Moreover, the power management unit reconnects the main power source to the circuit block when the notification signal is asserted and the output characteristic of the main power source is beyond the threshold value.

21 Claims, 3 Drawing Sheets

US 7,127,228 B2

PORTABLE ELECTRIC DEVICE WITH POWER FAILURE RECOVERY AND OPERATION METHOD THEREOF

FIELD OF THE INVENTION

The present invention relates generally to a portable electronic device with power failure recovery and, in particular, to a method for returning the portable electronic device having experienced interruption of power from a removable battery to its state prior to the power failure.

BACKGROUND OF THE INVENTION

Many electronic devices, including portable electronic devices such as wireless communication devices, utilize a removable battery for a power source. Power failures in the power source may occur for many reasons. For example, power failure may occur when the portable electronic device is hit or as the result of a battery bounce, so the removable battery is momentarily disconnected from the electronic circuitry of the portable electronic device. Such a temporary power failure may last for several microseconds, at most one second. After recovery from the power failure, the portable electronic device typically goes through a "rebooting" process. However, all of the data before the power failure is lost. This can be very annoying to the user. The simplest solution to the above-described problem is to provide a large auxiliary power device that takes over when a power failure in main battery occurs. This is still not satisfactory to users due to cost and inconvenience of the portable electronic device.

One portable electronic device of the prior art monitors recovery from the power failure by using a battery check routine it pushes on the stack of a micro-controller. The portable electronic device pops off the battery check routine from the stack upon determining a stable recovery, while returning to an exact point in a main program it left when it detected the power failure. Unfortunately, such a portable electronic device still requires a large auxiliary power source to keep the micro-controller working.

Another portable electronic device of the prior art stores the current operating state and the current time of the device in a non-volatile RAM upon detection of the power failure. After recovery from the power failure, the stored operating information is transferred to a processor of the portable electronic device. The processor also receives the failure time from the non-volatile RAM and recovery time from a built-in clock. The processor determines that the power failure is a short break and returns the device to the operation state before the power failure based on the above-described information on the operation state of the device if the period of the power failure falls within a resumption allowable time range. This method would require a considerable amount of non-volatile RAM to save the operating state. Furthermore, the portable electronic device needs additional timer to continue operation since the processor has to determine the period of the power failure.

Therefore, what is needed is a portable electronic device with power failure recovery, unencumbered by the limitations associated with the prior art.

SUMMARY OF THE INVENTION

It is an object of the invention to provide a portable electronic device that consumes minimal power of the auxiliary battery during a period of power failure in its main power source, and allows maximum time to recover from the power failure.

It is another object of the invention to provide a simple mechanism to automatically restart a portable electronic device without manual operation of a power button of the portable electronic device after power recovery.

It is yet another object of the invention to provide a portable electronic device that is capable of returning to its prior state following a power failure caused by battery dislodgement.

The present invention is directed to a portable electronic device with power failure recovery, and a method for operating the same. The portable electronic device is powered by a main power source, which comprises a power detection module, a processor, a timing unit and a power management unit. The power detection module detects an output characteristic from the main power source, so as to assert an interrupt signal if the detected output characteristic is below a first threshold value. In response to the interrupt signal, the processor asserts a turn-off signal and an enable signal. The timing unit, responsive to the enable signal, asserts a notification signal at a predetermined time interval when the enable signal is asserted, in which the timing unit is directly powered by a backup power source. The power management unit is electrically coupled to the main power source and the backup power source. The power management unit disconnects the main power source from a circuit block when the turnoff signal is asserted. Additionally, the power management unit reconnects the main power source to the circuit block when the notification signal is asserted and the output characteristic of the main power source is beyond a second threshold value. Another aspect of the invention is to disclose a portable electronic device with power failure recovery including a power detection module, a volatile RAM, a processor, a timing unit and a power management unit. The portable electronic device is powered by a main power source.

The power detection module detects an output characteristic from the main power source to assert an interrupt signal when a power failure in the main power source occurs and the detected output characteristic is below a first threshold value. The volatile RAM stores operation data when the power failure in the main power source occurs. The processor is adapted to respond to the interrupt signal, and asserts a turn-off signal and an enable signal. In response to the enable signal, the timing unit asserts a notification signal at a predetermined time interval when the enable signal is asserted. The power management unit is electrically coupled to the main power source and a backup power source. The power management unit supplies the timing unit and the volatile RAM with electrical power from the backup power source. In addition, the power management unit disconnects the main power source from a circuit block when the turn-off signal is asserted. The power management unit reconnects the main power source to the circuit block when the notification signal is asserted and the output characteristic of the main power source is beyond a second threshold value. Further, the processor performs a resume operation based on the operation data stored in the volatile memory when main power is resumed.

According to the invention, the portable electronic device employs the timing unit to achieve the power failure recovery function without extra component. Specifically, the processor does not have to perform a check routine or to determine a power break period when the main power source recovers from the failure, so the processor can return the portable electronic device to normal operation immediately.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE PREFERRED EMBODIMENT

Figure 1:
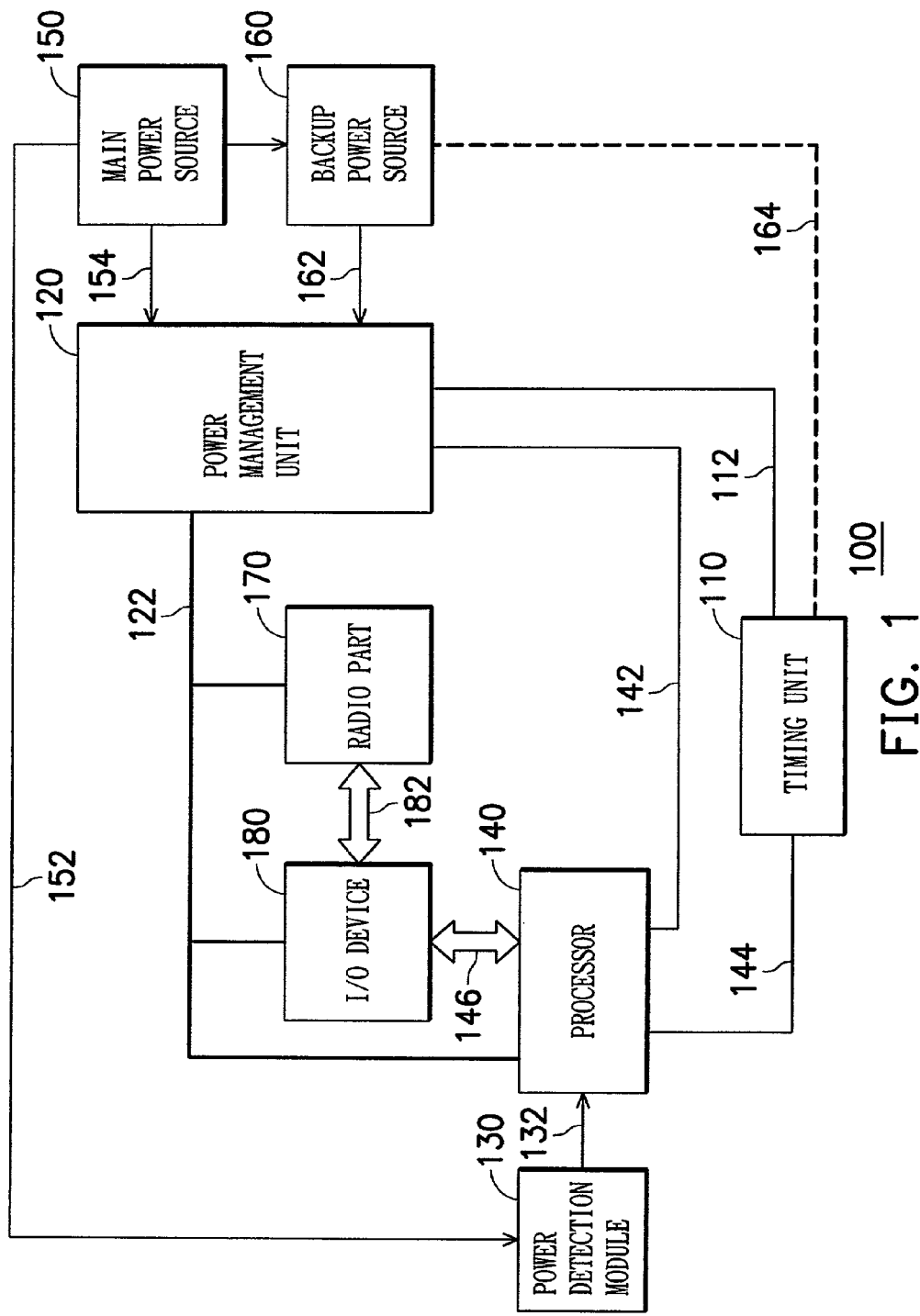
FIG. 1 is a block diagram illustrating an embodiment of a portable electronic device with power failure recovery according to the present invention.

Referring to FIG. 1, one embodiment of a portable electronic device with power failure recovery according to the present invention is illustrated. The portable electronic device 100 is powered by a main power source 150. The main power source 150 is a removable battery and the portable electronic device 100 is a wireless communication device such as a cellular phone. The portable electronic device 100 also has a backup power source 160 that supplies power to some necessary components during a break caused by a power failure in the main power source 150. Those necessary components consume very little power and enable the portable electronic device 100 to recover from the break when the power failure is overcome. One of the necessary components is timing unit 110 as shown in FIG. 1. A circuit block, including a processor 140, a radio part 170 and at least an input/output (I/O) device 180, consumes the majority of power of the portable electronic device 100. The radio part 170 is coupled to the I/O device 180 via line 182. The processor 140 communicates with the I/O device 180 via line 146. In addition, the portable electronic device 100 includes a power management unit 120 and a power detection module 130. The power management unit 120 is electrically coupled to the main power source 150 and the backup power source 160 via lines 154 and 162, respectively. The power management unit 120 supplies power to the circuit block with high power consumption, as mentioned previously, over power line 122. In the illustrated embodiment, the power detection module 130 monitors the voltage of the main power source 150. It is noted that other output characteristics, such as wattage, or amperage, of the main power source 150 can be monitored and used.

Figure 3:
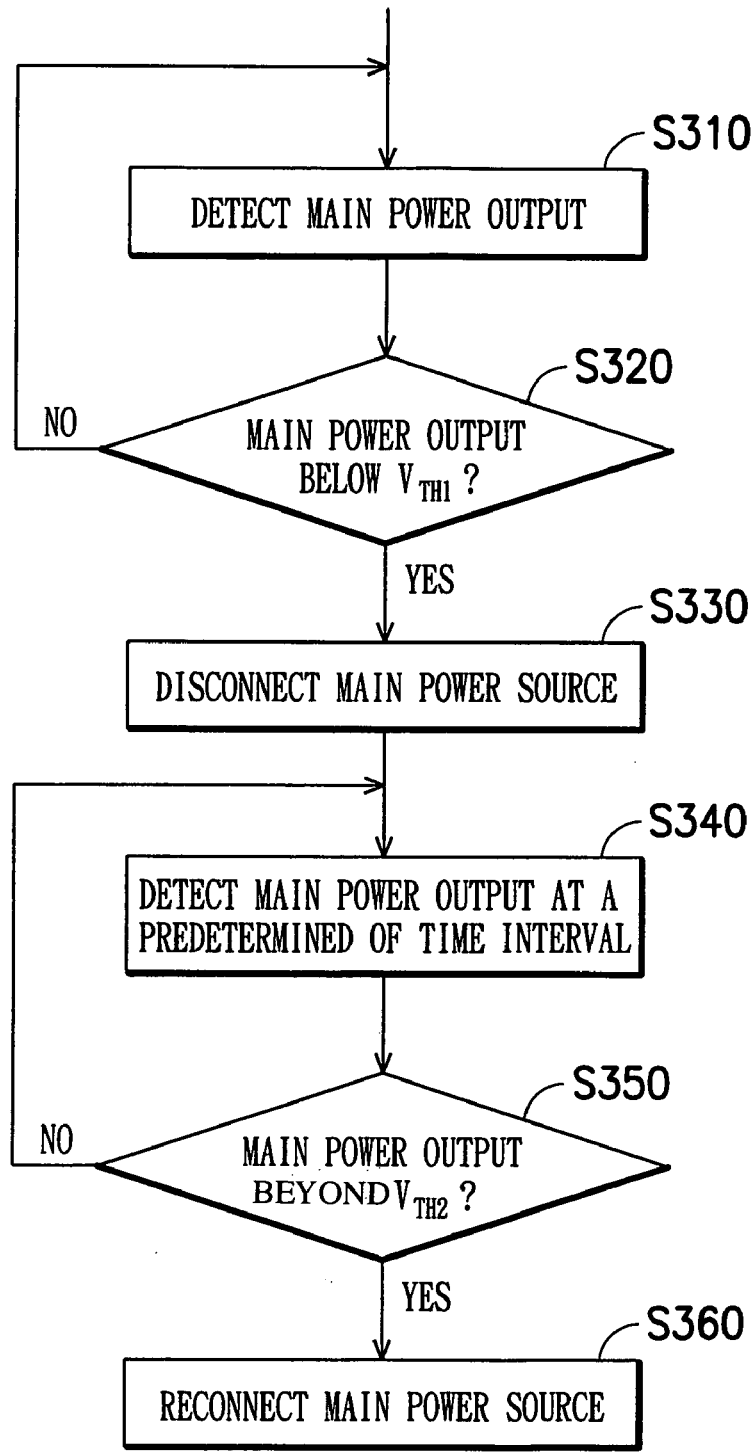
FIG. 3 is a flowchart exemplifying the basic operation of a portable electronic device with power failure recovery according to the present invention.

With continued reference to FIG. 1 and taken in conjunction with FIG. 3, the power detection module 130 detects the output voltage from the main power source 150 via line 152 (steps S310 and S340). The power detection module 130 asserts an interrupt signal 132 if the detected output voltage is below a first threshold value $V_{TH1}$ (step S320). In response to the interrupt signal 132, the processor 140 executes an interrupt service routine and asserts an enable signal 144 to activate the timing unit 110. The processor 140 then asserts a turnoff signal 142 and provides it to the power management unit 120. The timing unit 110, responsive to the enable signal 144, asserts a notification signal 112 at a predetermined time interval, in which the timing unit 110 is directly powered by the backup power source 160 via power line 164. The predetermined time interval, 0.5~1 sec. for example, is an allowable time range preset by the timing unit 110. The power management unit 120 disconnects the main power source 150 to the circuit block with high power consumption, including the processor 140, the radio part 170 and the I/O device 180, when the turn-off signal 142 is asserted (step S330) Additionally, the power management unit 120 reconnects the main power source 150 to the circuit block with high power consumption when the notification signal 112 is asserted and the output voltage of the main power source is beyond a second threshold value $V_{TH2}$ (steps S350 and S360). The processor 140, the radio part 170 and the I/O device 180 are powered up again and the portable electronic device 100 therefore restarts. It should be noted that the main power source 150 charges the backup power source 160 via line 156 when the output characteristic of the main power source 150 is beyond the second threshold value $V_{TH2}$. Furthermore, the backup power source 160 is a built-in battery or a large charged capacitor, and the first threshold value $V_{TH1}$ and the second threshold value $V_{TH2}$ may be the same.

In this way, the portable electronic device 100 consumes minimum power so that maximum time is available for recovery from the power failure. Moreover, when the main power source output is recovered (i.e., beyond the second threshold value $V_{TH2}$), the portable electronic device 100 can restart automatically without manual operation of a power button.

Figure 2:
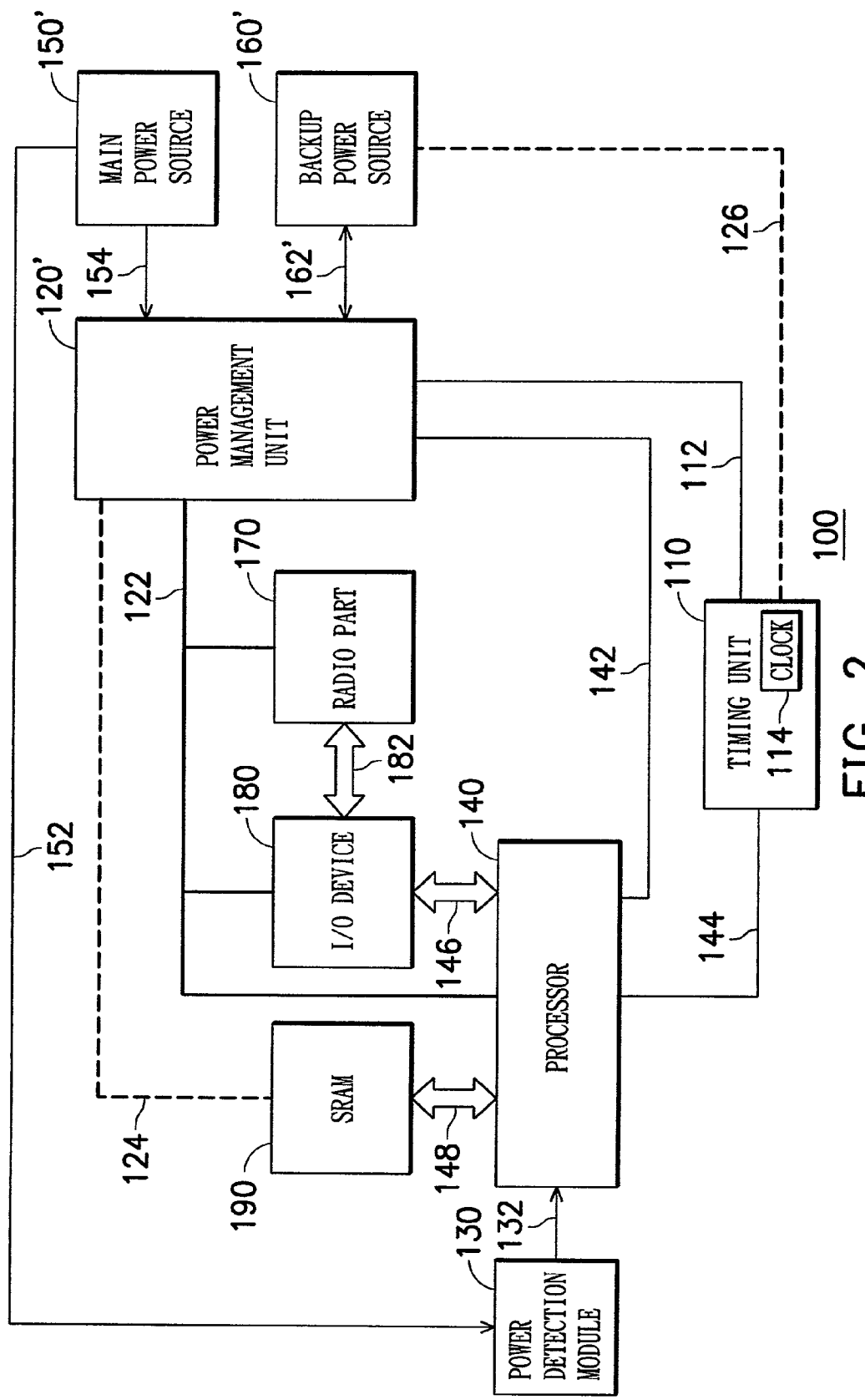
FIG. 2 is a block diagram illustrating an alternative embodiment of a portable electronic device with power failure recovery according to the present invention.

An alternative embodiment of a portable electronic device with power failure recovery is illustrated in FIG. 2. It is understood that components shown in FIG. 2 are similar to components shown in FIG. 1, and are identified by the same reference numbers. The portable electronic device 100 further includes a volatile random access memory (RAM) such as a static RAM (SRAM) 190. Power management unit 120' only supplies the SRAM 190 and timing unit 110 with power from backup power source 160' over power lines 124 and 126. As depicted, processor 140 communicates with the SRAM 190 via line 148. The SRAM 190 stores operation data when the power failure in main power source 150' occurs, and the SRAM is adopted due to its low power consumption. The power management unit 120' is electrically coupled to the main power source 150' and backup power source 160' via lines 154 and 162', respectively.

With continued reference to FIGS. 2 and 3, power detection module 130 detects the output voltage from the main power source 150' via line 152 (steps S310 and S340), and asserts an interrupt signal 132 if the detected output voltage is below a first threshold value $V_{TH1}$ (step S320). In response to the interrupt signal 132, the processor 140 executes an interrupt service routine and asserts an enable signal 144 to activate the timing unit 110. The processor 140 then asserts a turn-off signal 142 and provides it to the power management unit 120'. The timing unit 110, responsive to the enable signal 144, asserts a notification signal 112 at a predetermined time interval. The power management unit 120' disconnects the main power source 150' to a circuit block with high power consumption, including the processor 140, radio part 170 and I/O device 180, when the turn-off signal 142 is asserted (step S330). Additionally, the power management unit 120' reconnects the main power source 150' to the circuit block with high power consumption when the notification signal 112 is asserted and the output voltage of the main power source is beyond a second threshold value $V_{TH2}$ (steps S350 and S360). The processor 140, the radio part 170 and the I/O device 180 are powered up again and thus the portable electronic device 100 restarts. The processor 140 then performs a resume operation based on the operation data stored in the SRAM 190 to set the appropriate states of all components in the port device 100. It should also be noted that the power management unit 120' charges the backup power source 160' via line 162' when the output voltage of the main power source 150' is beyond the second threshold value $V_{TH2}$. Furthermore, the backup power source 160' is a battery cell or a capacitor with large capacitance, and the first threshold value $V_{TH1}$ and the second threshold value $V_{TH2}$ may be the same.

In this manner, the portable electronic device 100 can restart automatically without manual operation of a power button, when the main power source output is recovered (i.e., beyond the second threshold value $V_{TH2}$). The portable electronic device 100 interrupted by a power failure in the main power source 150' can return to its state prior to the power failure. Further, a user may set the SIM card PIN code or the security code of the portable electronic device 100, if the portable electronic device 100 is a cellular phone. When the cellular phone recovers from a temporary power failure, the PIN code or the security code can be entered automatically to conclude the restart procedure. In addition, the timing unit 110 also includes a clock 114 for keeping track of ongoing time and date, thus the time and date function of the portable electronic device 100 is updated accurately.

Accordingly, a portable electronic device with power failure recovery and a method for operating the same have been disclosed. The portable electronic device with power failure recovery consumes minimum power so that maximum time is available for recovering from a power failure. Furthermore, when the main power source output is recovered, the portable electronic device can restart automatically without manual operation of a power button of the portable electronic device. As well, the portable electronic device can return to its state prior to the power failure that is caused by battery dislodgement.

When the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A portable electronic device with power failure recovery, powered by a main power source, comprising:
    a power detection module, detecting an output characteristic from the main power source, for asserting an interrupt signal if the detected output characteristic is below a first threshold value;
    a processor, responsive to the interrupt signal, for asserting a turn-off signal and an enable signal;
    a timing unit, responsive to the enable signal, for asserting a notification signal at a predetermined time interval when the enable signal is asserted, wherein the timing unit is directly powered by a backup power source; and
    a power management unit, electrically coupled to the main power source and the backup power source, for disconnecting the main power source from a circuit block when the turn-off signal is asserted, and for reconnecting the main power source to the circuit block when the notification signal is asserted and the output characteristic of the main power source is beyond a second threshold value.

2. The portable electronic device as recited in claim 1 further comprising a volatile RAM powered by the backup power source, wherein the volatile memory stores operation data when the power failure in the main power source occurs.

3. The portable electronic device as recited in claim 2 wherein the processor performs a resume operation based on the operation data stored in the volatile memory when the main power source is reconnected by the power management unit.

4. The portable electronic device as recited in claim 1 wherein the timing unit further includes a clock for keeping track of ongoing time and date.

5. The portable electronic device as recited in claim 1 wherein the backup power source is charged by the main power source when the output characteristic of the main power source is beyond the second threshold value.

6. The portable electronic device as recited in claim 1 wherein the backup power source is charged by the power management unit when the output characteristic of the main power source is beyond the second threshold value.

7. The portable electronic device as recited in claim 1 wherein the main power source is a removable battery.

8. The portable electronic device as recited in claim 1 wherein the backup power source is a built-in battery.

9. The portable electronic device as recited in claim 1 wherein the backup power source is a large charged capacitor.

10. The portable electronic device as recited in claim 1 wherein the first threshold value and the second threshold value are the same.

11. The portable electronic device as recited in claim 1 wherein the circuit block includes the processor, a radio part and at least an input/output device.

12. The portable electronic device as recited in claim 3 wherein the volatile RAM is a static RAM with low power consumption.

13. The portable electronic device of claim 1, wherein the circuit block consumes the majority of power of the portable electronic device.

14. A portable electronic device with power failure recovery, powered by a main power source, comprising:
    a power detection module, detecting an output characteristic from the main power source, for asserting an interrupt signal when a power failure in the main power source occurs and the detected output characteristic is below a first threshold value;
    a volatile RAM, for storing operation data when the power failure in the main power source occurs;
    a processor, responsive to the interrupt signal, for asserting a turn-off signal and an enable signal;
    a timing unit, responsive to the enable signal, for asserting a notification signal at a predetermined time interval when the enable signal is asserted; and
    a power management unit, electrically coupled to the main power source and a backup power source, power supplying the timing unit and the volatile RAM from the backup power source, for disconnecting the main power source from a circuit block when the turn-off signal is asserted, and for reconnecting the main power source to the circuit block when the notification signal is asserted and the output characteristic of the main power source is beyond a second threshold value;
    wherein the processor performs a resume operation based on the operation data stored in the volatile memory when the main power source is reconnected.

15. The portable electronic device as recited in claim 14 wherein the timing unit further includes a clock for keeping track of ongoing time and date.

16. The portable electronic device as recited in claim 14 wherein the backup power source is charged by the main power source when the output characteristic of the main power source is beyond the second threshold value.

17. The portable electronic device as recited in claim 14 wherein the backup power source is charged by the power management unit when the output characteristic of the main power source is beyond the second threshold value.

18. The portable electronic device as recited in claim 14 wherein the first threshold value and the second threshold value are the same.

19. The portable electronic device as recited in claim 14 wherein the circuit block includes the processor, a radio part and at least an input/output device.

20. The portable electronic device as recited in claim 14 wherein the volatile RAM is a static RAM with low power consumption.

21. A method for an electronic device recovering from a power failure in a main power source, the electronic device comprising a circuit block, a power detection module, a timing unit, a main power source and a backup power source, wherein the main power source is selectively coupled to the circuit block, the power detection module is coupled to the main power source, and the timing unit is coupled to the backup power source, the method comprising:

disconnecting the main power source from the circuit block when an output characteristic detected by the power detection module is below a first threshold value;

detecting the output characteristic of the main power source with the power detection module in response to a notification signal asserted from the timing unit at a predetermined time interval; and reconnecting the main power source to the circuit block when the output characteristic detected by the power detection module is beyond a second threshold value.

* * * * *